US011227330B2

(12) United States Patent
Stewart

(10) Patent No.: US 11,227,330 B2
(45) Date of Patent: Jan. 18, 2022

(54) DETERMINING A PART HAVING AN ANOMALY IN EQUIPMENT AND INITIATING AN ELECTRONIC TRANSACTION FOR REPLACING THE PART USING A THREE-DIMENSIONAL (3D) MODEL OF THE EQUIPMENT

(71) Applicant: Lee Martin Stewart, Austin, TX (US)

(72) Inventor: Lee Martin Stewart, Austin, TX (US)

( * ) Notice: Subject to any disclaimer, the term of this patent is extended or adjusted under 35 U.S.C. 154(b) by 79 days.

(21) Appl. No.: 16/877,396

(22) Filed: May 18, 2020

(65) Prior Publication Data
US 2020/0279320 A1 Sep. 3, 2020

Related U.S. Application Data

(63) Continuation-in-part of application No. 16/780,795, filed on Feb. 3, 2020, which is a continuation of
(Continued)

(51) Int. Cl.
*G06Q 30/00* (2012.01)
*G06Q 30/06* (2012.01)
(Continued)

(52) U.S. Cl.
CPC ..... *G06Q 30/0643* (2013.01); *G06F 3/04815* (2013.01); *G06F 3/04842* (2013.01);
(Continued)

(58) Field of Classification Search
None
See application file for complete search history.

(56) References Cited

U.S. PATENT DOCUMENTS

| 5,002,513 A | 3/1991 | Weiss |
| 5,327,176 A | 7/1994 | Forler et al. |

(Continued)

FOREIGN PATENT DOCUMENTS

| WO | WO 00/57254 | 9/2000 | |
| WO | WO 01/93156 | 12/2001 | |
| WO | WO-2012148400 A1 * | 11/2012 | ............. H04L 67/10 |

OTHER PUBLICATIONS

Fadi M. Alsaleem et al. "HVAC System Cloud Based Diagnostics Model" International Refrigeration and Air Conditioning Conference. Paper 1508. (Year: 2014).*

(Continued)

*Primary Examiner* — Naeem U Haq
(74) *Attorney, Agent, or Firm* — Hulsey P.C.

(57) ABSTRACT

A system and method for determining a part having an anomaly in equipment and initiating electronic transaction for placing order to replace the part using three-dimensional (3D) model of equipment. The system inspects equipment to identify type of equipment and requests a data storage device storing 3D models of equipment to provide matching 3D models corresponding to equipment identified. The system utilizes various technologies to determine relative location of anomaly indicative of failing/failed part in equipment. The system overlays 3D image map from the 3D model to identify specific part/assembly/subassembly within the 3D model corresponding to the relative location of the anomaly. The system identifies additional parts associated with the failing/failed part as a kit in the 3D image map, and adds the kit to virtual shopping cart for initiating electronic transaction in reference to the kit depicted in the 3D model of equipment for replacement of the failing/failed part.

18 Claims, 8 Drawing Sheets

US 11,227,330 B2

Page 2

Related U.S. Application Data application No. 15/290,842, filed on Oct. 11, 2016, now Pat. No. 10,552,897, which is a continuation of application No. 14/581,199, filed on Dec. 23, 2014, now Pat. No. 9,489,689, which is a continuation of application No. 13/964,573, filed on Aug. 12, 2013, now abandoned, which is a continuation of application No. 13/906,100, filed on May 30, 2013, now abandoned, which is a continuation of application No. 13/219,294, filed on Aug. 26, 2011, now abandoned.

(60) Provisional application No. 61/379,877, filed on Sep. 3, 2010.

(51) Int. Cl.

| | | |
|---|---|---|
| *H04N 21/24* | (2011.01) | |
| *H04N 21/81* | (2011.01) | |
| *H04H 20/10* | (2008.01) | |
| *H04H 60/11* | (2008.01) | |
| *G06T 17/00* | (2006.01) | |
| *H04N 7/10* | (2006.01) | |
| *H04L 29/08* | (2006.01) | |
| *G06F 3/0481* | (2013.01) | |
| *G06F 3/0484* | (2013.01) | |
| *H04N 21/236* | (2011.01) | |
| *B33Y 80/00* | (2015.01) | |

(52) U.S. Cl.
CPC ..... *G06F 3/04845* (2013.01); *G06Q 30/0625* (2013.01); *G06Q 30/0633* (2013.01); *G06Q 30/0641* (2013.01); *G06T 17/00* (2013.01); *H04H 20/103* (2013.01); *H04H 60/11* (2013.01); *H04L 67/10* (2013.01); *H04N 7/104* (2013.01); *H04N 21/23614* (2013.01); *H04N 21/2404* (2013.01); *H04N 21/812* (2013.01); *B33Y 80/00* (2014.12)

(56) References Cited

U.S. PATENT DOCUMENTS

| | | |
|---|---|---|
| 6,083,267 A | 7/2000 | Motomiya |
| 6,215,526 B1 | 4/2001 | Barton et al. |
| 6,714,200 B1 | 3/2004 | Talnykin et al. |
| 7,315,830 B1 | 1/2008 | Wirtz et al. |
| 7,352,368 B2 | 4/2008 | Frazelle et al. |
| 7,353,192 B1 | 4/2008 | Ellis et al. |
| 7,661,121 B2 | 2/2010 | Smith et al. |
| 7,853,940 B1 | 12/2010 | Han et al. |
| 7,889,964 B1 | 2/2011 | Barton et al. |
| 8,175,933 B2 | 5/2012 | Cook, Jr. et al. |
| 9,015,059 B2 | 4/2015 | Sims, III et al. |
| 10,552,897 B2 | 2/2020 | Stewart |
| 10,565,566 B1* | 2/2020 | Davis ..................... G06Q 10/20 |
| 10,657,707 B1* | 5/2020 | Leise ...................... G06T 17/00 |
| 2002/0010655 A1 | 1/2002 | Kjallstrom |
| 2004/0019534 A1 | 1/2004 | Callahan |
| 2004/0249727 A1 | 12/2004 | Cook, Jr. et al. |
| 2005/0081161 A1 | 4/2005 | MacInnes et al. |
| 2008/0195492 A1 | 8/2008 | Postrel |
| 2010/0198563 A1 | 8/2010 | Plewe |
| 2011/0141109 A1 | 6/2011 | Radet et al. |
| 2014/0082177 A1* | 3/2014 | Lemire ................... F24F 11/30 709/224 |
| 2016/0086258 A1 | 3/2016 | Romes |
| 2016/0210685 A1* | 7/2016 | Batcheller .......... G06Q 30/0641 |
| 2017/0293894 A1* | 10/2017 | Taliwal .............. G06K 9/00671 |

OTHER PUBLICATIONS

Abner Li, "Google brings HVAC monitoring, early warnings to all Nest Thermostats" Oct. 30, 2020. Retrieved from https://9to5google.com/2020/10/30/nest-thermostats-hvac-monitoring/ (Year: 2020).*
H. Medellin et al.; "An automated system for the assembly of octree models" Assembly Automation; vol. 24, No. 3, 2004; p. 297-312 (Year: 2004).
www.arinet.com, retrieved Mar. 22, 2000.

* cited by examiner

DETERMINING A PART HAVING AN ANOMALY IN EQUIPMENT AND INITIATING AN ELECTRONIC TRANSACTION FOR REPLACING THE PART USING A THREE-DIMENSIONAL (3D) MODEL OF THE EQUIPMENT

RELATED APPLICATIONS AND CLAIM FOR PRIORITY

The present application is a continuation-in-part of co-pending U.S. patent application Ser. No. 16/780,795 filed Feb. 3, 2020, which is a continuation of a co-pending U.S. patent application Ser. No. 15/290,842 filed on Oct. 11, 2016, which is a continuation of a co-pending U.S. patent application Ser. No. 14/581,199 filed Dec. 23, 2014, which claims priority to Ser. No. 13/964,573 filed Aug. 12, 2013, which claims priority from U.S. patent application Ser. No. 13/906,100 filed May 30, 2013, which claims priority from U.S. patent application Ser. No. 13/219,294 filed Aug. 26, 2011, which claims priority from U.S. Provisional Patent Application Ser. No. 61/379,877 filed Sep. 3, 2010; all of which are incorporated herein by their entirety and referenced thereto.

FIELD OF INVENTION

The present invention generally relates to automatically placing an online order for replacing of a failing or failed part in equipment. More specifically, the present invention relates to a system, and a method for determining a part having an anomaly in equipment, the anomaly indicative of failing or failed part, and initiating an electronic transaction for placing an order to replace the part using a three-dimensional (3D) model of equipment.

BACKGROUND OF INVENTION

It is known that different equipment/products are used for performing variety of tasks or functions. Equipment may include, but not limited to, a machine, an engine, vehicles including land and air vehicles, heavy machinery, home appliances and so on. Each of equipment may comprise multiple parts that are interconnected to perform variety of functions.

As known, the parts in equipment may break over time, or equipment may require repair/maintenance from time to time. If any of the parts break, then a user or an operator operating equipment may find it difficult to identify the part for replacing the part with a new part. Further, the operator may use a maintenance schedule provided by a manufacturer of equipment to replace the part at predefined intervals. However, after years of use, the operator may not adhere to the maintenance schedule and find it difficult to replace the parts. Identifying the part that has broken down or likely to break down is extremely difficult unless equipment is uninstalled. However, uninstalling equipment for identifying the broken part takes a lot of time. Even after identifying the part that has broken down, identifying correct replacement part becomes another challenge.

In order to overcome the above-identified problems, several discrete solutions have been proposed in the past. An example of automatic ordering of maintenance parts for equipment is disclosed in a U.S. Pat. No. 9,015,059 B2, entitled "Wireless system for automatic ordering of maintenance parts for equipment." U.S. Pat. No. 9,015,059B2 discloses a wireless equipment management system that automatically orders parts in connection with equipment maintenance schedules generated using sensors remotely located with equipment. The system additionally uses diagnostic software to analyze fault conditions within equipment using the sensors, and parts are automatically ordered in conjunction with equipment service needs as determined by the system.

An example of purchasing a replacement part online is disclosed in a United States patent application No. 20040019534A1, entitled "Methods and apparatus for purchasing a replacement part for a product." US20040019534A1 discloses a system for facilitating the purchase of a replacement part online with the aid of an interactive exploded view of the product the replacement part goes into are disclosed. Initially, the system helps an online user identify a particular product for which a replacement part is desired. Once the product is identified (e.g., by model number), the system transmits an interactive exploded view of the product. Preferably, the interactive exploded view is a perspective view of at least a portion of the identified product showing how the parts fit together even though most of each part is visible. The interactive exploded view includes selectable regions for each replacement part. When the user clicks on a part in the interactive exploded view, the part is added to an electronic shopping cart. Subsequently, the shopping cart order may be fulfilled by an appropriate parts vendor.

An example of using a 3D model file of the part to select and order a replacement part online is disclosed in a United States patent application No. 20170300214A1, entitled "Three Dimensional Model Launch Tools and Methods of Use." US20170300214A1 discloses methods and systems for launch tools incorporating at least one of launch features and selection features on websites to launch a 3D model from the website, from a 3D model file associated with a selected product, within a separate software application. For example, the website may include a shopping cart tool, and the product and associated 3D model file may be selected to populate a shopping cart such that a user may place an online order for the product. The user may also be able to view the 3D model of the 3D model file associated with the product through a launch tool, whether a virtual form of the product is already in the shopping cart or on another product selection page of the website. The launch tool automatically launches the separate software application with the 3D model.

It should be understood that each of the above-discussed disclosures tries to solve different problems and has limitations. For example, a user looking to purchase a replacement part using the disclosure of U.S. Pat. No. 9,015,059B2 will not consider incorporating the 3D model file as disclosed in US20170300214A1 in selecting the correct replacement part. This is because; there is no means available for the user to ensure that the 3D model of the part available online is correct match for the part that needs to be replaced. As a result, the user may end up ordering different part. This can become time-consuming and frustrating for the user.

Therefore, there is a need for improvement in the system for accurately determining a part having an anomaly in equipment and initiating an electronic transaction for placing an order to replace the part using a three-dimensional (3D) model of equipment.

SUMMARY

It is an object of the present invention to provide a system and a method for determining accurate location of the part that needs to be replaced and placing an order online for replacing the part and that avoids the drawback of known techniques.

In order to achieve the object, the present invention provides a system and a method for determining a part having an anomaly in equipment i.e., a failing or failed part and initiating an electronic transaction for placing an order to replace the part using a three-dimensional (3D) model of equipment.

In one technical feature of the present invention, the system includes a combination of hardware and software that is capable of determining a part having an anomaly in equipment and initiating an electronic transaction for placing an order to replace the part using a Three-Dimensional (3D) model of equipment.

In accordance with the present invention, the system may comprise a drone, a robot or an electronic device. The system is communicatively connected to equipment/products. Equipment may include a machine, an engine, vehicles including land and air vehicles, heavy machinery, home appliances or any other apparatus. Equipment further includes parts that are interconnected to perform the desired operations of equipment. Further, the system is communicatively connected to a data storage device. Data storage device may indicate a server storing 3D models of equipment and its parts. Data storage device further stores parametric data and metadata associated with the 3D models of equipment and its parts. The system is further communicatively connected to an electronic order system. Electronic order system may indicate an ecommerce platform comprising a listing of parts/equipment offered by a seller.

In accordance with one implementation of the present invention, the system is dispatched on a predefined route/preprogrammed path to inspect equipment for determining if any of the parts is failing or has failed i.e., part having an anomaly. Alternatively, the system might be positioned in various other ways to inspect equipment. For example, if the system includes a drone, then the drone might be configured to fly/maneuver in a preprogrammed path to inspect equipment. In one embodiment, equipment includes a failure detection unit configured to identify failing or failed or damaged part or an anomaly of in a part, and communicate to the system. The anomaly in a part might indicate a failure or likelihood of failure occurring in the part based on excess thermal friction, sounds or other anomalies that might be exhibited by the part. The failure detection unit communicates the anomaly in a form of an electronic signature or error codes to the system. The system receives the error message and identifies a type of equipment, its parts and any part that has an anomaly. After identifying equipment, the system requests data storage device to obtain three-dimensional (3D) models corresponding to equipment. Data storage device processes a query received from the system and retrieves the 3D models that match with search criteria received from the system. Further, data storage device transmits the matching 3D models to the system. After receiving the 3D model of equipment, the system superimposes or overlays the 3D model over equipment. In one example, the system may prompt a user to identify or highlight the part and associated parts to the part identified within the 3D model of equipment such that the user may group the part and the associated parts as a "kit". In another example, data storage device may suggest the associated parts corresponding to the part/anomaly identified. After identifying the kit (part and associated parts), the system may allow the user to add the kit to a (shopping) cart in an electronic order system such that the user can initiate and execute an electronic transaction for placing an order for delivery of the kit to a physical location of the user or equipment.

In another implementation, if equipment does not include a failure detection unit for broadcasting an error message, then the system uses an equipment detection unit comprised therein to identify equipment. Equipment detection unit may include one of Radio-frequency identification (RFID) reader, a Quick Response (QR) Code Scanner, an image sensor such as a camera and any other similar sensor capable of detecting equipment. Equipment detection unit may identify a type of equipment. After identifying, the system requests data storage device for 3D models corresponding to equipment identified. Data storage device queries its database and retrieves the 3D models matching the query. Further, data storage device transmits the 3D models to the system.

The system accesses the 3D models, and then determines a relative location of the part having an anomaly. In other words, the system determines a relative location of a failing or failed part in equipment. In order to determine the relative location of the failing or failed part, the system utilizes an anomaly detection unit comprised therein. The anomaly detection unit includes one of a thermal camera, an infrared camera, a high definition camera and an echolocation sensor configured to identify the anomaly i.e., failing or failed part. As specified above, the failing or failed part may generate an excess amount of heat, friction or demonstrate other anomalies such as unusual sounds such as grinding, whining, whistling or other sounds. For instance, a thermal camera can be employed to identify a source of excess friction i.e., anomaly in a part and a relative location of the part can be identified. Further, a 3D image map from the 3D model is obtained from data storage device and is overlaid or superimposed over the relative location of the failing or failed part. Further, X, Y and Z coordinates of the part in the 3D model is compared with the relative location of the failing part. In addition, a confidence factor is utilized corresponding to the relative location of the part to specifically identify or to confirm the failing part in the 3D model.

After identifying the failing part in the 3D model, associated parts corresponding to the failing part is identified in the 3D model. In the current embodiment, the part and associated parts are formed as a kit. As such, the user can select or highlight the kit and add the kit to a (shopping) cart in an electronic order system for initiating an electronic transaction to place an online order for delivery of the kit to a physical location of the user or equipment.

In one advantageous feature of the present invention, the system ensures that the system allows the user to accurately determines the relative location of the failing or failed part within the 3D model of equipment. As such, there is no need to physically examine equipment to identify the failing part and then separately search online to select and place an order for replacement part. Further, the system allows the user to overlay the 3D image map from the 3D model over equipment and it is compared with relative location of the failing or failed part identified using various technologies such as thermal, infrared, imaging and echolocation technologies. The system assigns a confidence factor to identify specific part(s)/assemblies/subassemblies in the 3D model corresponding to the relative location of the failing or failed part. This ensures that accurate parts are identified in the 3D model corresponding to the failing or failed part. Further, the user can highlight associated parts within the 3D models that form a kit along with the identified part. As such, the user can place order for the kit at once replenishing the part/kit instead of ordering them separately.

As specified above, the system allows identifying location of the failing part accurately using different technologies (e.g., thermal sensor), which further allows identifying specific part(s)/assemblies/subassemblies within the 3D model. As such, the system can be operated with less or no human intervention whenever there is a need to identify a failing part in equipment and automatically place an order for new part.

Features and advantages of the subject matter hereof will become more apparent in light of the following detailed description of selected embodiments, as illustrated in the accompanying FIGURES. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE EMBODIMENTS

Figure 1:
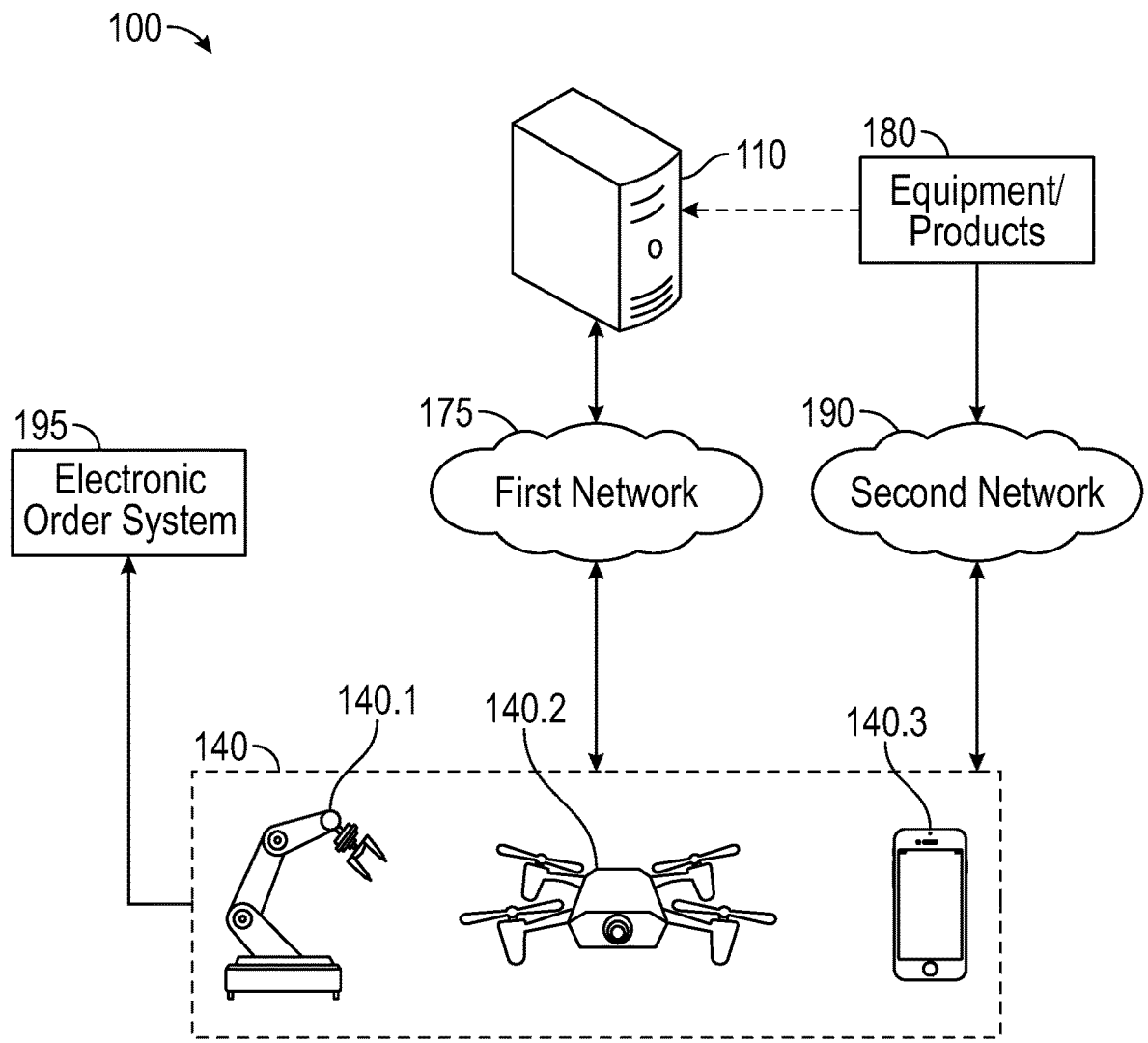
FIG. 1 illustrates an environment 100 in which a system 140 for determining a part having an anomaly in equipment and initiating an electronic transaction for placing an order to replace the part using a three-dimensional (3D) model of equipment is implemented, in accordance with one embodiment of present invention.

The detailed description set forth below in connection with the appended drawings is intended as a description of exemplary embodiments in which the presently disclosed subject matter can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed subject matter may be practiced without these specific details. In some instances, well-known structures and devices are shown in functional or conceptual diagram form in order to avoid obscuring the concepts of the presently disclosed method and system.

In the present specification, an embodiment showing a singular component should not be considered limiting. Rather, the subject matter preferably encompasses other embodiments including a plurality of the same component, and vice-versa, unless explicitly stated otherwise herein. Moreover, the applicant does not intend for any term in the specification or claims to be ascribed an uncommon or special meaning unless explicitly set forth as such. Further, the present subject matter encompasses present and future known equivalents to the known components referred to herein by way of illustration.

Although the present disclosure provides a description of a system and method for determining a part having an anomaly in equipment and initiating an electronic transaction for placing an online order for replacing the part using a three-dimensional (3D) model of equipment, it is to be further understood that numerous changes may arise in the details of the embodiments of this system, and a method for determining a part having an anomaly in equipment and initiating an electronic transaction for placing an order to replace the part using a Three-Dimensional (3D) model of equipment. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

It should be understood that the present invention describes a system and a method for determining a part having an anomaly in equipment and initiating an electronic transaction for placing an order to replace the part using a three-dimensional (3D) model of equipment. The system inspects equipment to identify a type of equipment. The system then requests a data storage device storing 3D models of equipment to provide matching 3D models corresponding to equipment identified. The system utilizes various technologies to determine a relative location of an anomaly indicative of failing or failed part in equipment. Further, the system overlays a 3D image map from the 3D model to identify a specific part/assembly/subassembly within the 3D model corresponding to the relative location of the anomaly. Further, the system identifies additional parts that are associated with the failing or failed part as a kit in the 3D image map. The system adds the kit to a virtual shopping cart for initiating an electronic transaction in reference to the kit depicted in the 3D model of equipment for replacement of the failing or failed part.

Various features and embodiments of the system and a method for determining a part having an anomaly in equipment and initiating an electronic transaction for placing an order to replace the part using a three-dimensional (3D) model of equipment are explained in conjunction with the description of FIGS. 1-7.

In one embodiment, the present invention discloses a system for determining a part having an anomaly in equipment and initiating an electronic transaction for placing an order to replace the part using a three-dimensional (3D) model of equipment. FIG. 1 shows an environment 100 in which a system 140 is implemented. The environment 100 includes a data storage device 110, system 140, at least one equipment 180, and an electronic order system 195. Although FIG. 1 is depicted to include only one equipment 180, it should be understood that there could be more than one equipment 180 in the environment 100. For ease of explanation, single equipment 180 is considered. As can be seen, data storage device 110 and system 140 are communicatively connected via a first network 175. System 140 and the at least one equipment 180 are communicatively connected via a second network 185. Further, system 140 is communicatively connected to electronic order system 195 via a network (not shown) such as local area network (LAN), wide area network (WAN), Internet, and the like.

Figure 2:
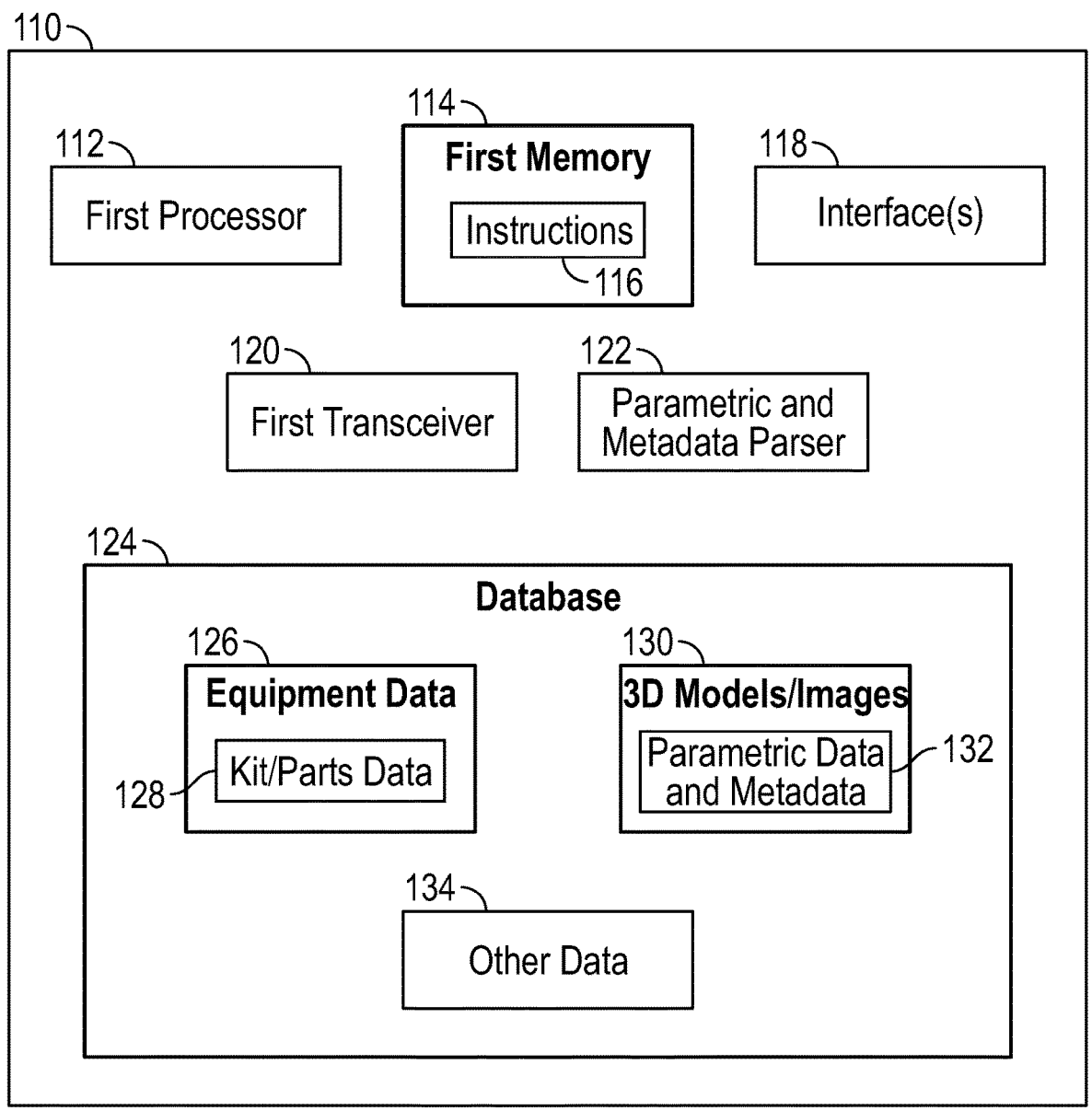
FIG. 2 illustrates a block representation of a data storage device 110 communicatively connected to system 140, in accordance with one embodiment of present invention.

Data storage device 110 might include a server or database configured to store data corresponding to the at least one equipment 180. Referring to FIG. 2, a block diagram of data storage device 110 is shown, in accordance with one embodiment of present invention. Data storage device 110 includes a first processor 112 (e.g., a central processing unit (CPU), a graphics processing unit (GPU) or both. Data storage device 110 includes a first memory 114 which communicate with first processor 112 via a bus (not shown).

First processor 112 may include any suitable processing device, such as a microprocessor, microcontroller, integrated circuit, logic device, or other suitable processing device.

First memory 114 may include one or more computer-readable media, including, but not limited to, non-transitory computer-readable media, RAM, ROM, hard drives, flash drives, or other memory devices. First memory 114 may store information accessible by first processor 112, including computer-readable instructions 116 that can be executed by first processor 112. Instructions 116 can be any set of instructions that when executed by first processor 112, cause first processor 112 to perform operations.

In one example, first memory 114 can be used to store data that can be retrieved, manipulated, created, or stored by first processor 112. Instructions 116 may also reside, completely or at least partially, within first memory 114 and/or within first processor 112 during execution thereof by data storage device 110, first memory 114 and first processor 112 also constituting machine-readable medium. Instructions 116 may further be transmitted or received over first network 175 via a first transceiver utilizing any one of a number of well-known transfer protocols or a custom protocol.

Data storage device 110 includes a user interface (UI) 118 i.e., software or Application interface allowing a user of system 140 to interact with data storage device 110.

Data storage device 110 further includes a first transceiver 120 configured to send and receive data from data storage device 110 to other devices such as system 140, and the at least equipment 180.

Data storage device 110 further includes a parametric and metadata parser 122 for parsing data corresponding to parametric data and metadata stored in data storage device 110.

Data storage device 110 further includes a database 124. Database 124 indicates a data structure configured for storing information. In the current embodiment, database 124 includes equipment data 126, 3D models/images 130 and other data 134. Equipment data 126 includes name, type, serial number, manufacturer, manufacturing date, model number, maintenance schedule, etc. of equipment 180. Equipment data 126 further includes kit/parts data 128. In other words, equipment data 126 includes data corresponding to parts that are interconnected or assembled to form equipment 180. It should be understood that a group of parts that are used together for performing certain function could be formed as a kit. In other words, the kit includes a group of associated/related parts within equipment. It should be understood that the term "part" may encompass a discrete component such as a screw or a spring, and the "kit" may encompass a group of associated parts, assembly or a sub-assembly.

3D models/images 130 includes 3D image maps of the parts and equipment 180. 3D models/images 130 further includes parametric data and metadata 132. The parametric data and metadata 132 includes nomenclature, description, size, weight, price, part number, manufacturer name, serial number, model number, etc. of the part/kit.

As can be seen in FIG. 1, data storage device 110 is communicatively connected to system 110 via first network 175. System 140 may include a humanoid or industrial robot 140.1, an unmanned vehicle 140.2, an electronic device 140.3, and other machine or apparatus, collectively referred as system 140. The unmanned vehicle 140.2 may include a drone or specially designed machine/vehicle. Electronic device 140.3 may include, but not limited to, a mobile phone, a desktop, a laptop, and so on. For ease of explanation, the present invention is explained considering that system 140 is an unmanned vehicle i.e., a drone, however a person skilled in the art will readily understand that other devices including the examples described above might be used for detecting a part having an anomaly in equipment and initiating an electronic transaction for placing an order for replacing the part and associated parts.

Figure 3:
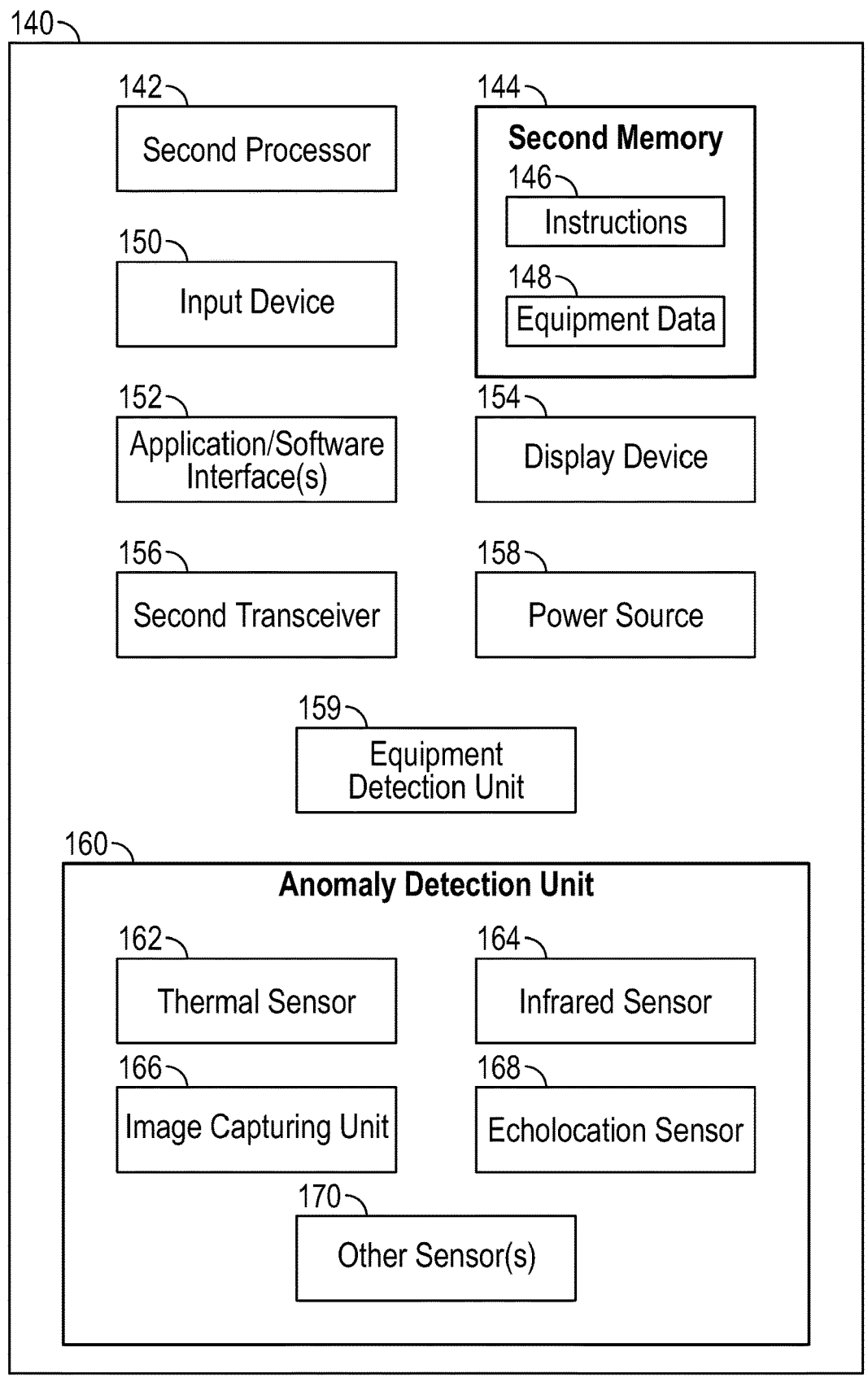
FIG. 3 illustrates a block diagram of system 140, in accordance with one embodiment of the invention.

Referring to FIG. 3, a block diagram of system 140 is shown, in accordance with one embodiment of present invention. System 140 includes a second processor 142, and a second memory 144. Second processor 142 may include any suitable processing device, such as a microprocessor, microcontroller, integrated circuit, logic device, or other suitable processing device.

Second memory 144 may include one or more computer-readable media, including, but not limited to, non-transitory computer-readable media, RAM, ROM, hard drives, flash drives, or other memory devices. Second memory 144 may store information accessible by second processor 142, including computer-readable instructions 146 that can be executed by second processor 142. Instructions 146 can be any set of instructions that when executed by second processor 142, cause second processor 142 to perform operations.

In one example, second memory 144 can be used to store data that can be retrieved, manipulated, created, or stored by second processor 142.

Instructions 146 may also reside, completely or at least partially, within second memory 144 and/or within second processor 142 during execution thereof by system 140, second memory 144 and second processor 142 also constituting machine-readable medium. It should be understood that the term "machine-readable medium" might be taken to include a single medium or multiple media (e.g., a centralized or distributed database, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" may accordingly be taken to include, but not be limited to, solid-state memories, optical and magnetic media, and carrier wave signals. Instructions 146 may further be transmitted or received over first network 175 via a second transceiver 156 utilizing any one of a number of well-known transfer protocols or a custom protocol.

In one alternate implementation, second memory 144 might comprise equipment data. Equipment data might include name, type, serial number, manufacturer, part list of the at least one equipment 180.

System 140 further includes an input device 150 such as a mouse, a keyboard/keypad, or a touch screen for providing an input to system 140. System 140 includes an application/software interface(s) 152 for allowing a user of system 140 to interact with components of system 140 and to communicate data/information with other devices such as data storage device 110, the at least one equipment 180, electronic order system 195 and so on.

System 140 includes a display device 154 for displaying data in the form of text/video to the user. Further, system 140 includes a second transceiver 154 for sending and receiving data from other devices such as data storage device 110, the at least one equipment 180, electronic order system 195 and so on.

System 140 further includes a power source 156 for operating system 140. The power source 156 may include a rechargeable battery or an electric cord plugged to an energy source (AC/DC).

System 140 further includes at least one equipment detection unit 159. The at least one equipment detection unit 159 might be used to identify/detect the at least one equipment 180. The at least one equipment detection unit 159 may include, but not limited to a Radio-frequency identification (RFID) reader, Quick Response (QR) Code Scanner, a barcode reader, an image sensor such as a camera or any other similar sensor configured to identify the at least one equipment 180.

In accordance with one embodiment of the present invention, system 140 includes an anomaly detection unit 160. The anomaly detection unit 160 might be used for determining a part that has an anomaly. In other words, the anomaly detection unit 160 is configured to detect if any part of the at least one equipment 180 is damaged/defective or is failing or failed. The anomaly in the part can be determined if the part is generating an excess amount of heat, friction or demonstrating other anomalies such as unusual sounds such as grinding, whining, whistling or other sounds. In one implementation, the anomaly detection unit 160 may comprise a thermal sensor 162, an infrared (IR) sensor 164, an image-capturing unit 166, an echolocation sensor 168 and other sensor(s) 170.

Thermal sensor 162 might be configured to measure an amount of heat energy or even cold that is generated by one or more parts within the at least one equipment 180. Thermal sensor 162 senses or detects any physical change of the one or more parts or their surrounding in terms of temperature, and produces either an analogue or digital output.

The IR sensor 164 might be configured to sense certain characteristics of the one or more parts within the at least one equipment 180 and its surroundings. The IR sensor 164 might be configured to sense or measure the heat emitted or detection of the motion of the one or more parts within the at least one equipment 180.

The image-capturing unit 166 may include an optimal instrument such as a camera capable of recording images or videos. The image-capturing unit 166 might be configured to capture images or videos and transmit them to second memory 144 for lateral retrieval or instant processing of the images/video by second processor 142. In the current embodiment, the image-capturing unit 166 is used for capturing still images or video of the one or more parts within the at least one equipment 180 either in still or during operation to identify any change in their standard placement or motion.

The echolocation sensor 168 includes a single or an array of microphones configured to record echoes from one or more parts within the at least one equipment 180 and compute their location in a three-dimensional space.

It should be understood that each of thermal sensor 162, the IR sensor 164, the image-capturing unit 166, the echolocation sensor 168 and other sensor(s) 170 is configured to operate individually or in combination to identify an anomaly in one of more parts within the at least one equipment 180. When employed, each of thermal sensor 162, the IR sensor 164, the image-capturing unit 166, the echolocation sensor 168 and other sensor(s) 170 detects an anomaly in the one or more parts within the at least one equipment 180 and sends a signal to second processor 142.

First network 175 may include a wireless network, a wired network or a combination thereof. First network 175 can be implemented as one of the different types of networks, such as intranet, local area network (LAN), wide area network (WAN), the internet, and the like. First network 175 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further first network 175 may include a variety of network devices, including routers, bridges, servers, computing devices, storage devices, and the like.

Figure 4:
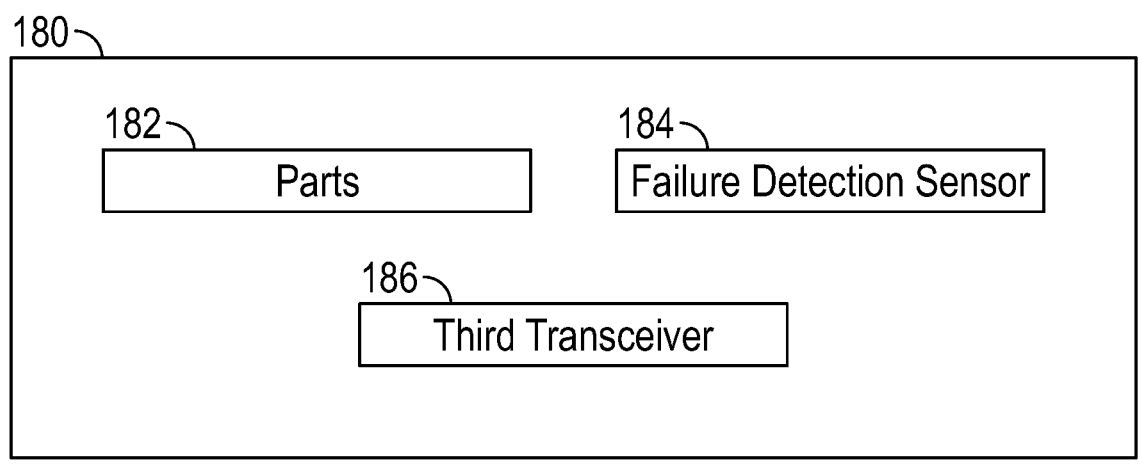
FIG. 4 illustrates a block diagram of equipment 180 communicatively connected to system 110, in accordance with one embodiment of the invention.

As can be seen in FIG. 1, data storage device 110 is communicatively connected to the at least one equipment 180 via a second network 180. The at least one equipment 180 may include any product or equipment machine, an engine, vehicles including land and air vehicles, heavy machinery, home appliances and so on. It should be understood that for ease of explanation, only one equipment 180 is shown in FIG. 1, however a person skilled in the art will understand that system 140 might be used for identifying and ordering parts that needs to be replaced for more than one equipment 180. Referring to FIG. 4, a block diagram of the at least one equipment 180 is shown, in accordance with one embodiment of present invention. The at least one equipment 180 may comprise of one or more parts 182 interconnected or assembled for performing desired function of the at least one equipment 180. For example, consider the at least one equipment 180 to be an Internal Combustion (IC) engine, then the one or more parts 182 may include components such as a cylinder block, a cylinder head, a piston, piston rings, a connecting rod, a crank shaft, an engine bearing, a crankcase, valves, a spark plug, an injector and so on. In another example, consider that the at least one equipment 180 to be an aircraft, then the one or more parts 182 may include components such as a fuselage, wings, wing flaps, an empennage, a landing gear, and so on.

In one embodiment, the at least one equipment 180 may comprise a failure detection unit 184. The failure detection unit 184 may indicate a sensor configured to detect failing or failed part within the at least one equipment 180. In other words, the failing or failed part may indicate a part having an anomaly. Although a single failure detection unit 184 is shown in FIG. 4, it should be understood that more than one failure detection unit 184 might be utilized for detecting failing or failed part 182 within the at least one equipment 180.

The at least one equipment 180 further includes a third transceiver 186 communicatively connected to the failure detection unit 184. Whenever the failure detection unit 184 detects that certain part 182 is failing or has failed, then the failure detection unit 184 may send an error message to the third transceiver 186, which then sends the error message to system 140 via second network 190. The error message may include data such as part number, size, serial number and so on.

Second network 190 may include a short-range wireless network such as a Bluetooth, ZigBee, Radio-frequency Identification (RFID), beacons, Near Field Communication (NFC) and so on. Alternatively, second network 190 may include a wireless network, a wired network or a combination thereof. Second network 190 can be implemented as one of the different types of networks, such as intranet, local area network (LAN), wide area network (WAN), the internet, and the like. Second network 190 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another.

Electronic order system 195 may indicate a website or an application (software) of an ecommerce platform residing in system 140. Alternatively, electronic order system 195 may indicate a third part website/application implemented at a separate device such as a kiosk or desktop which is communicatively connected to system 140 via a wireless network, a wired network or a combination thereof. In the current embodiment, electronic order system 195 might comprise a database of listing of parts or equipment offered or made available by sellers/manufacturers. Alternatively, electronic order system 195 may indicate an application facilitating sellers/manufacturers of equipment to list their products such that users of system 140 may select a part or equipment and place an online order for delivery of the part/equipment to their location.

Referring back to FIG. 1, the interaction of data storage device 110, system 140, the at least one equipment 180 and electronic order system 195 is explained. At first, data storage device 110 is configured with the information corresponding to the at least one equipment 180. Specifically, data storage device 110 is configured with list of each part 182 of the at least one equipment 180. Further, for each part 182, associated parts that are required for proper functioning of the part is stored as a "kit". In other words, the kit indicates a group of associated parts that are needed to properly perform a function. As specified above, the term "part" may encompass a discrete component such as a screw or a spring, and the "kit" may encompass a group of associated parts, assembly or a sub-assembly. If the part fails or breaks down, then the entire kit (parts and the associated parts) might have to be replaced to perform the function. In the current embodiment, data corresponding to parts and/or kit is stored in the kit/part data 128. Further, data storage device 110 is configured to store three-dimensional (3D) models of the at least one equipment 180. In one example, the 3D model may include 3D images of each part/kit of the at least one equipment 180. Specifically, the 3D models of the at least one equipment 180 are stored in the 3D models/images 130. Further, database 124 might be configured to store parametric data and metadata corresponding to the 3D models of each part/kit 182 of the at least one equipment 180. As specified above, each part may include a single component and a kit indicates a group of parts or assembly or sub-assembly of the parts. In accordance with the current embodiment, 3D assembly of the parts/kit is decomposed to its discrete parts for selecting specific parts or sub-assemblies such that the parts can be added along with their associated parts. As such, parametric data and metadata of the parts/equipment may include nomenclature, description, size, weight, price, part number, manufacturer name, serial number, model number, etc. of the part/kit. It should be understood that parametric data and metadata 132 are used to easily identify the parts and its associated parts of the at least one equipment 180.

After configuring data storage device 110 with data corresponding to the at least one equipment 180, parametric data and metadata of the parts/equipment might be updated in electronic order system 195 such that the user of system 140 may utilize parametric data and metadata to search and place order for replacement of the parts.

In order to access data storage device 110 for obtaining 3D models of at least one equipment 180, at first, a user of system 140 might have to register with data storage device 110. In order to register, the user might be prompted to provide his name, password, address, and other credentials. As specified above, the user may use system 140 to interact with data storage device 110 via first network 175.

Figure 5A:
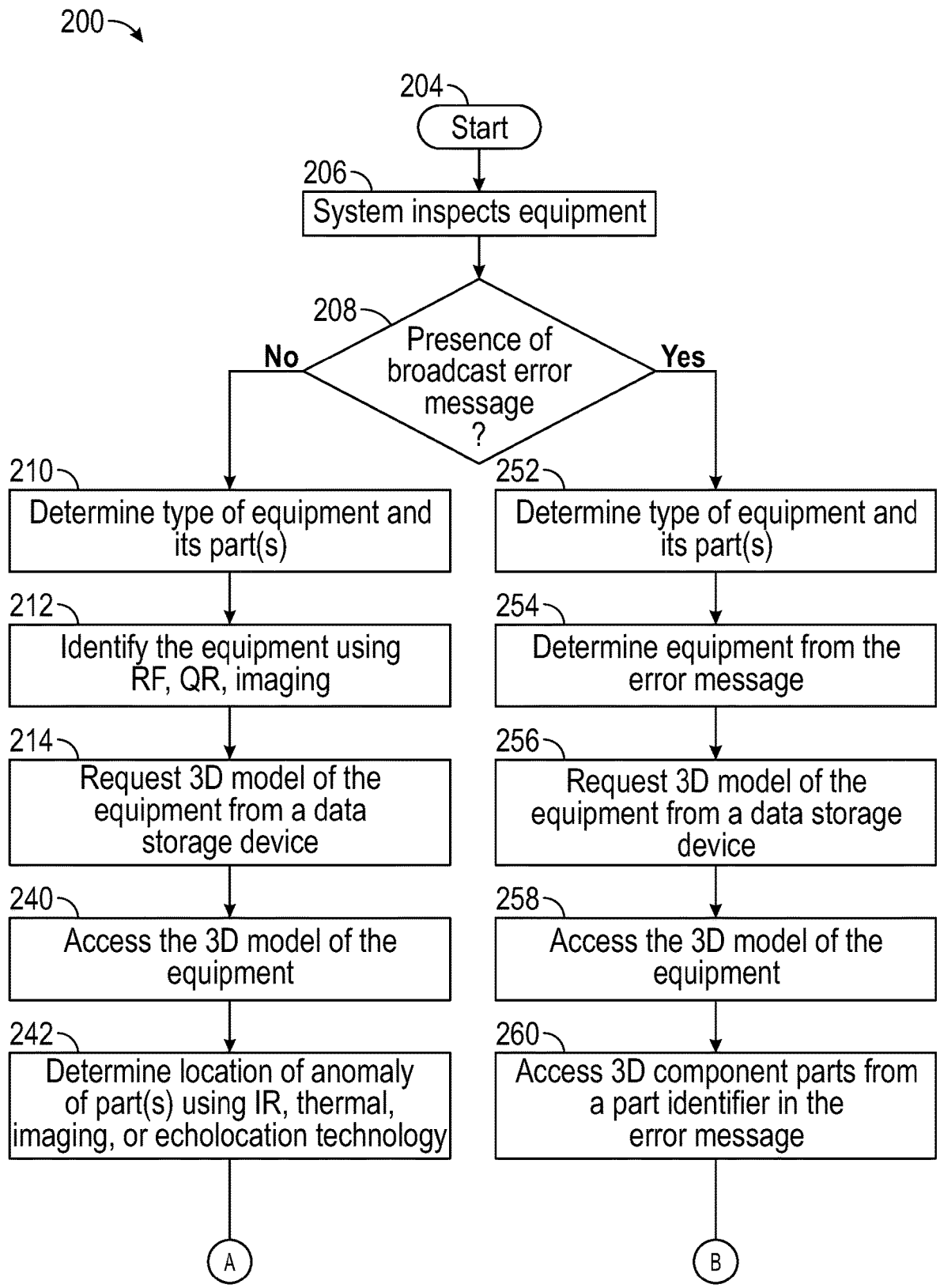
FIGS. 5A and 5B illustrates a method 200 for determining a part having an anomaly in equipment and initiating an electronic transaction for placing an order to replace the part using a three-dimensional (3D) model of equipment, in accordance with one embodiment of the invention.
Figure 5B:
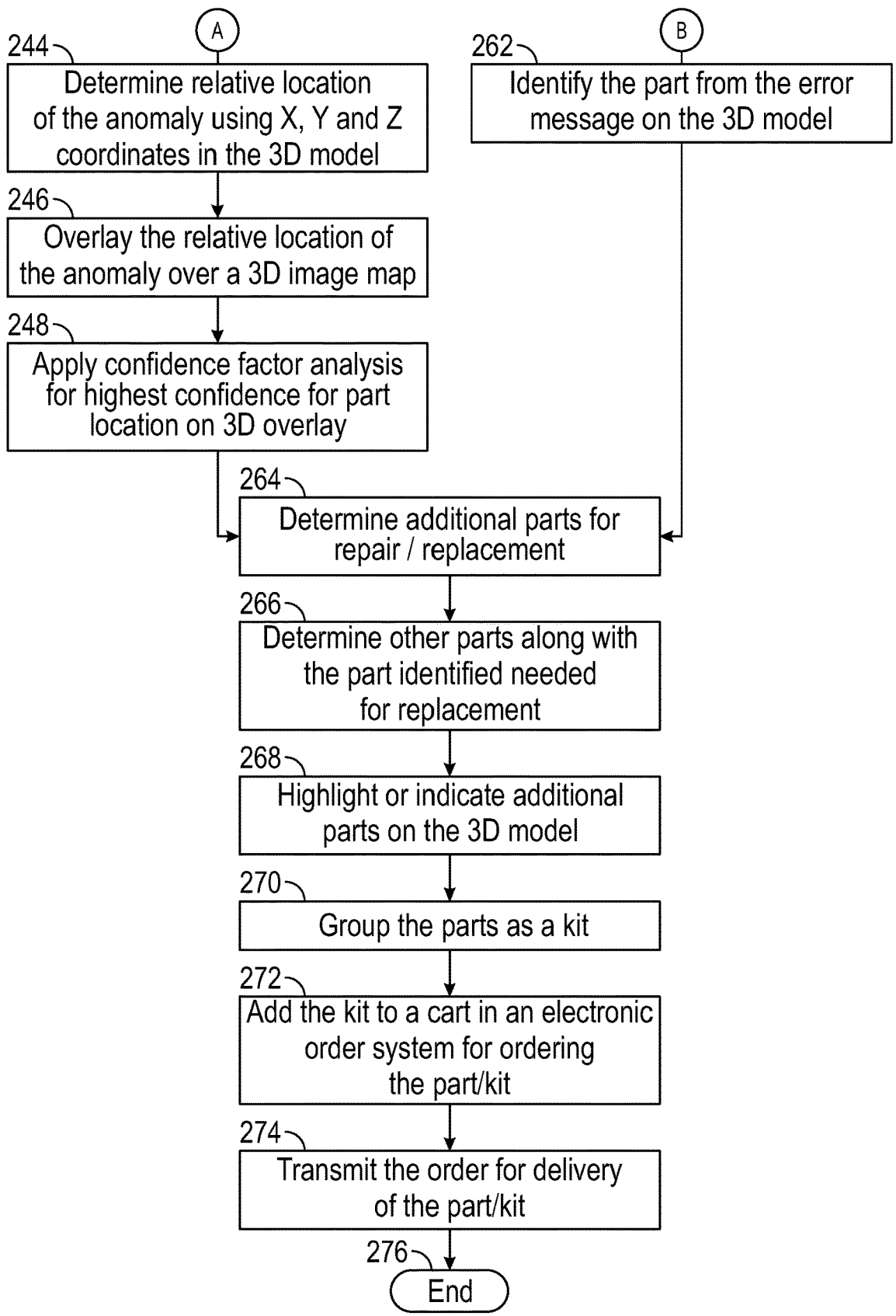

Now referring to FIGS. 5A and 5B, a method 200 of detecting a part having an anomaly in at least one equipment 180 and initiating an electronic transaction for placing an order for replacing of the part and associated parts 182 is explained, in accordance with one exemplary embodiment of the present invention. The order in which method 200 is described should not be construed as a limitation, and any number of the described method blocks can be combined in any order to implement method 200 or alternate methods. Additionally, individual blocks may be deleted from method 200 without departing from the spirit and scope of the subject matter described herein. Furthermore, method 200 can be implemented in any suitable hardware, software, firmware, or combination thereof. However, for ease of explanation, in the embodiments described below, method 200 might be implemented using the above-described system 140.

In order to use system 140 for detecting a part 182 having an anomaly within the at least one equipment 180, system 140 might be sent on a preprogrammed path. For example, consider that system 140 is an unmanned vehicle i.e., a drone, then the drone might be preprogrammed to take a certain path for inspecting the at least one equipment 180. In another example, if system 140 includes a mobile phone, then the user of the mobile phone may position the mobile phone to scan or inspect the at least one equipment 180 using one of the anomaly detection unit 160 present in system 140. It should be understood that other ways may also be used for inspecting the at least one equipment 180 using system 140.

The method 200 starts at step 204. As specified above, system 140 might be sent on a preprogrammed path to inspect the at least one equipment 180. It should be understood that system 140 is sent on the preprogrammed path to check if there is any part within the at least one equipment 180 which has an anomaly indicating that the part has broken down or likely to break down due to which the at least one equipment 180 is not preforming its intended task. As such, system 140 inspects the at least one equipment 180, as shown at step 206. It should be understood that system 140 inspects the at least one equipment 180 to determine a type of the at least one equipment 180. In order to determine the type of the at least one equipment 180, system 140 may check if the at least one equipment 180 is broadcasting an error message, as shown at step 208. If the at least one equipment 180 includes the failure detection sensor 184, then method 200 moves to step 252. If the at least one equipment 180 does not include a failure detection sensor 184, then method 200 moves to step 210.

At step 210, system 110 tries to determine the type of the at least one equipment 180. In order to determine the type of the at least one equipment 180, system 140 may employ equipment detection unit 159. As specified above, equipment detection unit 159 includes the RF reader, QR Scanner, barcode scanner, image sensor or any other sensor. For instance, if the at least one equipment 180 includes a Quick Response (QR) code, then system 140 might employ the QR Scanner to determine the type of the at least one equipment 180, as shown at step 212. Similarly, if equipment detection unit 159 includes a Radio Frequency identification (RFID) tag, then system 140 may employ the RF reader to detect and determine the type of the at least one equipment 180. System 140 may determine the type of the at least one equipment 180 using one of nomenclature, model number, serial number and other data.

After determining the type of the at least one equipment 180, system 140 may request data storage device 110 to provide three-dimensional (3D) models of the at least one equipment 180, as shown at step 214. As specified above, data storage device 110 stores the 3D models/images and corresponding parametric data and metadata of the at least one equipment 180. In order to request data storage device 110 to provide 3D models, the user of system 140 may provide search criteria using the Application/Software interface 152. The search criteria may include keywords corresponding to the at least one equipment 180 and its parts 182. The search criteria may include parametric data and metadata such as nomenclature of the at least one equipment, serial number, model number of the at least one equipment, and so on corresponding to the at least one equipment 180. For example, the user may provide model number and/or manufacturer's name as the search criteria in the Application/Software interface 152. After providing the search criteria, system 140 may transmit the request to data storage device 110 via second transceiver 156.

Figure 6:
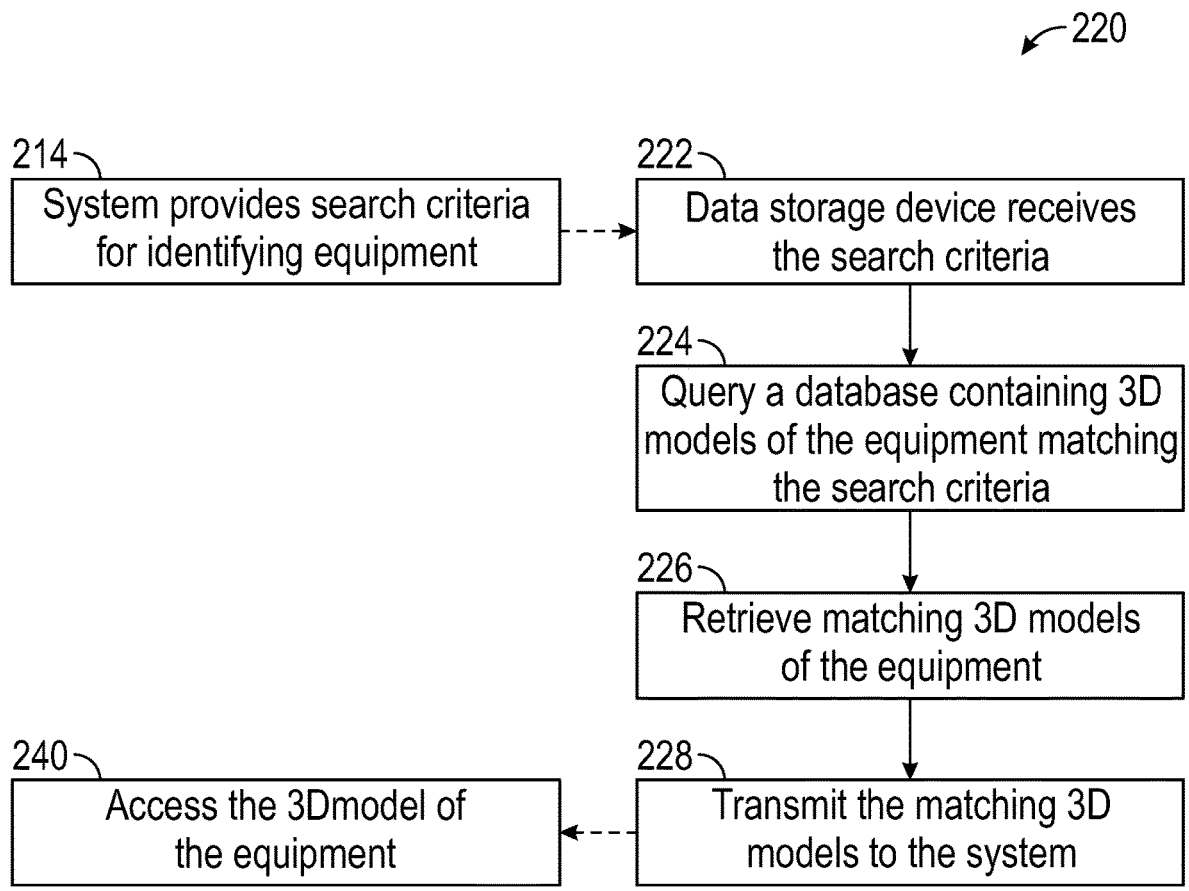
FIG. 6 illustrates a method 220 implemented by data storage device 110 upon receiving a request from system 140 for obtaining 3D models of equipment 180, in accordance with one embodiment of present invention.

Now referring to FIG. 6, a method 220 implemented by data storage device 110 upon receiving the request from system 140 for 3D models of the at least one equipment 180 is explained.

At step 222, data storage device 110 receives the search criteria from system 140. After receiving the search criteria, data storage device 110 may query database 124, as shown at step 224. In order to query database 124, data storage device 110 may employ parametric and metadata parser 122 for analyzing a string of text, symbols or other data inputted by the user in the search criteria. The parametric and metadata parser 122 may parse the search criteria and send it to first processor 112. First processor 112 may then use the parsed query to search for matching 3D models stored in the 3D models/images 132. Specifically, first processor 112 utilizes parametric data and metadata 132 to match the 3D models/images corresponding to the search criteria.

After identifying the matching 3D models corresponding to the search criteria, first processor 112 may retrieve the matching 3D models from database 124, as shown at step 226. Subsequently, data storage device 110 may employ first transmitter 130 to transmit the matching 3D models to system 140.

Now referring back to FIGS. 5A and 5B, system 140 utilizing the 3D models for determining a failing or failed part is explained. At step 240, system 140 receives and accesses the 3D models of the at least one equipment 180. Subsequently, system 140 may use the 3D models received from data storage device 110 to determine location of failing or failed part (anomaly) in the at least one equipment 180. In order to determine the anomaly, system 140 might employ one of the anomaly detection unit 160. For example, consider that the at least one equipment 180 is an Internal Combustion (IC) engine. If any part e.g., a piston is broken/cracked due to wear and tear, then the piston could generate an excess amount of heat, friction or demonstrate other anomalies such as unusual sounds such as grinding, whining, whistling or other sounds. In order to determine location of the anomaly, system 140 might employ thermal sensor 162 to identify the source of excess friction caused by the anomaly, as shown at step 242. The source (location) of excess friction is considered as a relative location of the anomaly. System 140 might use X, Y and Z coordinates of the parts of the at least one equipment 180 is in the 3D model to determine a relative location of the anomaly within the 3D model corresponding to location of the anomaly determined by the anomaly detection unit 160, as shown at step 244. It should be understood that system 140 may stream the 3D model over the at least one equipment 180 to determine the relative location of the anomaly within the 3D model. Subsequently, system 140 might use a 3D image map in the 3D model obtained from data storage device 110 and compare the X, Y and Z coordinates from the 3D model to determine the relative location of the anomaly. In other words, system 140 overlays a 3D image map from the 3D model to identify a specific part/assembly/subassembly within the 3D model corresponding to the relative location of the anomaly, as shown at step 246.

After identifying the specific part/assembly/subassembly within the 3D model corresponding to the relative location of the anomaly, system 140 may apply a confidence factor corresponding to the location of the parts in the 3D model overlaid over the anomaly, as shown at step 248. The confidence factor might be determined using known techniques. For example, the confidence factor might be determined based on how close the anomaly with respect to the position of a specific part depicted in 3D model of the at least one equipment 180. In one example, a weightage might be assigned to the confidence factor to ensure accuracy in identifying the specific part in the 3D model with respect to the location of the anomaly. If the confidence factor is high, then the specific part that has highest confidence factor is considered as the part that needs to be replaced. Upon determining the specific part within the 3D model corresponding to the relative location of the anomaly in the at least one equipment 180, method 200 moves to step 264.

If at step 208, system 140 detects that the at least one equipment 180 includes the failure detection sensor 184, then system 140 may request the at least one equipment 180 to broadcast an error message. The error message might be configured to indicate an anomaly in a part or failing or failed part. In one implementation, whenever system 140 is communicatively connected to the at least one equipment 180, the failure detection sensor 184 may detect if any of the parts 182 is failing or has failed already. If any of the parts 182 has failed or likely to fail, then the failure detection sensor 184 may automatically broadcast the error message to system 140, via the third transceiver 186. It should be understood that the error message may comprise information corresponding to the nomenclature, serial number, part number of the part that has failed or likely to fail and so on. As such, when system 140 receives the error message, system 140 use the information comprised in the error message to determine the type of the at least one equipment 180, as shown at step 252. Further, system 140 may determine the at least one equipment 180 and its parts 182 from the error message, as shown at step 254.

After determining the at least one equipment 180 and its parts 182, system 140 may request data storage device 110 to provide 3D models of the at least one equipment 180, as shown at 256. When system 140 requests data storage device 110, data storage device 110 implements method 220 explained above and sends the 3D models corresponding to the search criteria received from system 140. Subsequently, system 140 accesses the 3D models of the at least one equipment 180, as shown at step 258. At step 260, system 140 accesses 3D component of the part/anomaly from the 3D model corresponding to the part identified from the error message. Further, system 140 identifies specific part/assembly/subassembly within the 3D model corresponding to the part identified, as shown at step 262. After identifying the specific part/assembly/subassembly within the 3D model, method 262 moves to step 264.

At step 264, system 140 may determine if additional parts are associated with the part (anomaly) identified such that the part and associated parts can be formed as a kit. As such, system 140 may determine associated parts corresponding to the specific part/assembly/subassembly identified within the 3D model, as shown at step 266. In order to determine the associated parts, the user of system 110 might use the Application/software interface 152 to highlight or indicate the associated parts on the 3D model of the at least one equipment 180, as shown at step 268. Further, the highlighted parts are grouped as a kit, as shown at step 270. Alternatively, the user may drag and drop associated parts that are part of the kit corresponding to the part (anomaly) identified. For example, if the part/anomaly identified for replacement is a valve, then the kit/additional/associated parts may include consumables such as seals, gaskets, springs, which are used in conjunction with part selected for replacement.

In one example, once the part is selected in the 3D model for replacement/purchase, system 140 may display parametric data and metadata associated with the part. In the present example, the user of system 140 may select or hover over the part with a pointer of the input device 150. When the part is selected, system 140 may alert the user that the selected part is also available as part of a kit. This may be accomplished through display of text on the display device 154, through highlighting, shading or coloring the constituent parts of the kit, and/or by drawing a border around the parts of the kit, or the like. In addition, the display of metadata may optionally be triggered by hovering over a portion of the rendered 3D image with a pointer of input device 150 or the like, i.e., without actually selecting the part. In one example, the metadata may further include information identifying that the part is also available as part of a kit, or include information regarding other parts which the manufacture has indicated should be replaced along with a given part.

Optionally, system 140 of the present invention may graphically illustrate the relationship of the selected part to the other parts that collectively form the kit or assembly or subassembly. For example, system 140 may allow the user to draw a border encompassing all of the parts of a kit, or system 140 may itself denote the constituent parts of a given kit or subassembly using color, shading or the like.

After selecting the kit, the user might be prompted to add the kit to a cart in electronic order system 195 for ordering/purchasing the kit, as shown at step 272. After adding the kit in the cart, system 140 may transmit/place the order to a seller for delivery of the kit at a physical location of the user, as shown at step 274. In one example, parametric data and metadata associated with the part/kit including the description, price, weight, size, part number, etc., may also be transferred to the cart in electronic order system 195, as needed. It should be understood that purchase of the kit is initiated by, for example, right clicking on the rendered 3D image of desired/identified part and adding the part to the virtual shopping cart, or simply by dragging the part to the virtual shopping cart.

Although it is explained considering that parametric data and metadata typically includes the part name, part number, and so on. However, parametric data and metadata may also indicate that the selected part is part of a kit of a subassembly whereas a kit is a collection of related parts, which the manufacturer recommends being replaced contemporaneously (along with the selected part).

Although it is explained above considering that system 140 suggests the associated parts when the part is selected in the 3D model for replacement, it is should be understood that electronic order system 195 may also suggest or list other associated parts/kit that other users have purchased in conjunction with the selected part(s).

Optionally, once system 140 identifies the part in the 3D model, then system 140 may communicate with data storage device 110. Data storage device 110 may suggest the associated parts that form a kit for the part identified. Subsequently, data storage device 110 may transmit a list of identified parts as a kit to electronic order system 195 for placing an order for purchasing the kit.

The method 200 ends at step 276.

Figure 7:
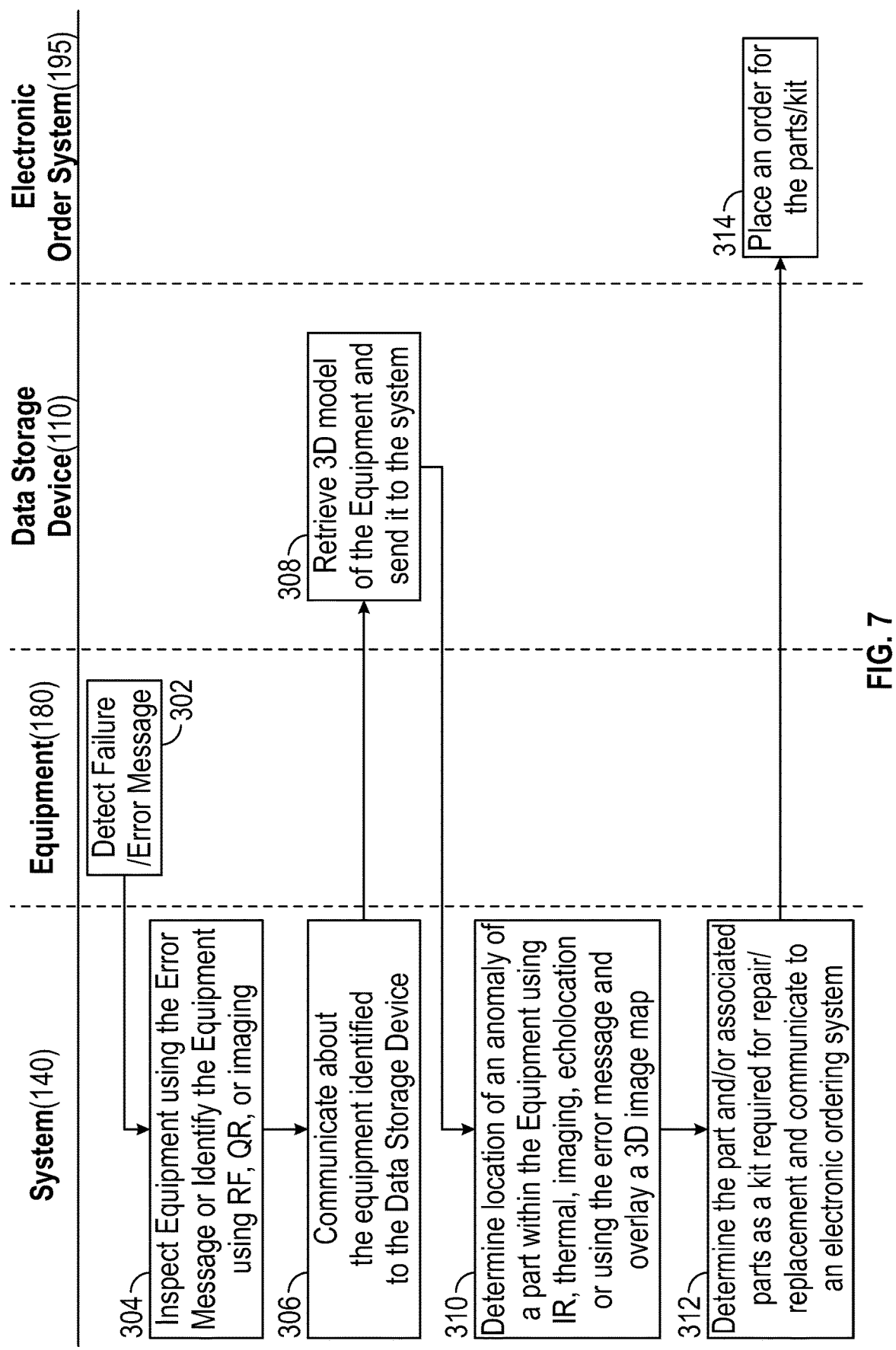
FIG. 7 illustrates a timing diagram illustrating a sequence of steps that are being performed for determining a part having an anomaly in equipment and initiating an electronic transaction for placing an order to replace the part using a three-dimensional (3D) model of equipment, in accordance with one exemplary embodiment of present invention.

Now referring to FIG. 7, a timing diagram illustrating a sequence of steps that are performed for determining a part having an anomaly in equipment and initiating an electronic transaction for placing an order to replace the part using a Three-Dimensional (3D) model of equipment, in accordance with one exemplary embodiment of the present invention. It should be understood that the timing diagram is only presented to further enable method 200 described in FIGS. 5A and 5B and should not be construed to limit the scope of the subject-matter described above. The order in which the steps are illustrated should not be construed as a limitation, and any number of the described blocks can be combined or some of the blocks may be deleted to obtain alternate methods without departing from the spirit and scope of the subject matter described herein. Furthermore, the blocks/steps described in the timing diagram can be implemented in any suitable hardware, software, firmware, or combination thereof.

At first, system 140 inspects the at least one equipment 180 to determine the type of the at least one equipment 180. If the at least one equipment 180 includes the failure detection sensor 184, then the failure detection sensor 184 may broadcast an error message to system 140 via the third transceiver 186, as shown at step 302.

At step 304, system 140 receives the error message broadcasted from the at least one equipment 180 and identifies type of the at least one equipment 180 and its parts. If the at least one equipment 180 does not include a failure detection sensor 184, then system 140 may employ equipment detection unit 159 to identify the type of the at least one equipment 180. As specified above, equipment detection unit 159 may use one of the RF, QR or imaging techniques to identify the type of the at least one equipment 180.

After identifying the type of the at least one equipment 180, system 140 may request data storage device 110 to provide 3D models corresponding to the at least one equipment 180 identified, as shown at step 306. As specified above, the user of system 140 may provide search criteria corresponding to the at least one equipment 180 and its parts in order to obtain the 3D models of the at least one equipment 180.

At step 308, data storage device 110 receives the search criteria, and processes a query (keywords) for retrieving matching 3D models from database 124. After retrieving the matching 3D models, data storage device 110 communicates the matching 3D models to system 140, as shown at step 308.

At step 310, system 140 determines a relative location of the part (having an anomaly). In order to determine the location of the anomaly, system 140 may employ the anomaly detection unit 160 (one of thermal sensor 162, the IR sensor 164, the image-capturing unit 166, the echolocation sensor 168 and other sensor(s) 170). After determining the relative location of the anomaly, system 140 may overlay a 3D image map to identify a specific part within the 3D model corresponding to the relative location of the anomaly. As specified above, system 110 may use a confidence factor to ensure accurate location of the specific part within the 3D model corresponding to the relative location of the anomaly.

After identifying the part within the 3D model, system 140 may determine associated parts corresponding to the part identified. In one example, the user may query data storage device 110 to obtain a list of associated parts that are suggested/recommended by a manufacturer of the at least one equipment 180. Optionally, the user of system 140 may highlight associated parts for the part identified. The user may group the part and the associated parts as a kit and communicate to electronic order system 195 to place an order for the kit, as shown at step 312.

At step 314, the user may access electronic order system 195 and execute as an electronic transaction for purchasing and delivering of the kit at a physical location of the user or at the location of the at least one equipment 180.

In a further embodiment of the present invention, the system can be implemented as an autonomous drone or robot, In such an implementation, the system can be configured to identify the failing part and replace the parts without any intervention from the user. In the present embodiment, the system may identify the relative location of the failing part and use the 3D model to identify the part and kit, and subsequently place an order for a new part which can be used for replacing the failing part. Further, the system might be configured to remove and replace the failed part that had been previously identified based on the relative location of the failed part. In the current embodiment, the 3D models may include parametric data and metadata corresponding to machine instructions for the system to follow and information as to the serviceable access points into equipment. The parametric data and metadata may further comprise repair code/instructions as to how to remove parts, sections, access panels, covers, etc. The system may access the failed part and use the repair code/instructions to remove the part(s) and then the installation of the replacement part(s). The parametric data and metadata may also comprise instructions to validate and perform testing checks. After installing the replacement parts, the system can be configured to reassemble the sections, access panels, covers, etc.

Based on the above, it is evident that the system in combination with data storage device can be used for identifying a type of equipment, obtaining corresponding 3D models from data storage device, determining a relative location of the failing or failed part and overlaying the 3D model of equipment to accurately determining in 3D model which is then used for placing an order for replacing the failed part. After determining the part in the 3D model, the subject matter allows the user to identify associated parts that are likely to be replaced along with the part identified. The associated parts are identified similar to the embodiments disclosed in a U.S. Pat. No. 10,552,897, entitled "3D Imaging", which was disclosed by Applicant's of the present invention. After determining the associated parts, the parts are grouped as a kit and the user is prompted to add the kit to an ecommerce shopping cart or virtual shopping cart. Further, the user completes electronic transaction such that a seller of the parts/kit physically delivers the kit.

As can noted in the above description, the system includes an anomaly detection unit which allows the user to determine a relative location of the failing part. Further, the system uses a 3D image map from the 3D models obtained from data storage device to compare the X, Y and Z coordinates from the 3D model to the relative location of the part. The system utilizes a confidence factor for the parts in the 3D model relative to the area of the relative location corresponding to the source of the failing part to identify the specific part(s)/assemblies/subassemblies in the 3D model.

Once the part is identified, other parts considered to be associated parts to the part identified is also determined. Subsequently, the kit is added to a shopping cart of an electronic order system such as an ecommerce platform to execute an electronic transaction for placing an order for replacing the parts.

It should be understood that the system allows the user to accurately identify the relative location of the anomaly within the 3D model of equipment. As such, there is no need to physically examine equipment to identify the failing part/anomaly. Further, the system allows the user to overlay the 3D image map from the 3D model over equipment and it is compared with relative location of the anomaly identified using various technologies such as thermal, infrared, imaging and echolocation technologies. By assigning a confidence factor, the accurate location of the part is identified within the 3D model. Further, the user may highlight associated parts within the 3D models that form a kit along with the identified part. The kit may further be added to a shopping cart for placing an order for replenishing the part/kit.

Although the above disclosure is generally described in which the system for determining a part having an anomaly in equipment and initiating an electronic transaction for placing an order to replace the part using 3D models of equipment is implemented as a single system, it should be understood that the disclosed system might be scaled up such that multiple equipment can be inspected at once for determining the failed parts and uses 3D models for placing an order for replacing the failed parts. Alternatively, multiple systems might be used, in which each of the system communicates with data storage device and inspects multiple equipment for determining the failed parts and uses 3D models for placing an order for replacing the failed parts in each of equipment.

In one alternate implementation, the system itself might be configured to store 3D models of equipment in its memory or in equipment data (148 in FIG. 3). In such an implementation, once the system identifies the type of equipment, the system can automatically retrieve corresponding 3D models from the memory. After retrieving the matching 3D models, the system may overlay the 3D image map from the 3D model and employ the anomaly detection unit to identify the relative location to compare with the location of part within the 3D model as explained above. It should be understood that in such implementation, the system works as a standalone device without the need to query data storage device for obtaining 3D models of equipment.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in data processing arts to most effectively convey the substance of their work to others skilled in the art. These operations, while described functionally or logically, should be understood as being implemented by computer programs.

Further, certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

It should be understood that components shown in figures are provided for illustrative purpose only and should not be construed in limited sense. A person skilled in the art will appreciate alternate components that might be used to implement the embodiments of the present invention and such implementations will be within the scope of the present invention.

While preferred embodiments have been described above and illustrated in the accompanying drawings, it will be evident to those skilled in the art that modifications may be made without departing from this invention. Such modifications are considered as possible variants comprised in the scope of the invention.

What is claimed is:

1. A method for determining a failing or failed part in equipment and initiating an electronic transaction for placing an online order for replacing the failing or failed part, method comprising:
   inspecting, by a system, equipment;
   detecting, by the system, presence of an error message being broadcasted from equipment;
   if the error message is not being broadcasted by equipment, identifying, by the system, a type of equipment by scanning equipment;
   requesting, by the system, three-dimensional (3D) models corresponding to equipment identified from a data storage device;
   accessing, by the system, the 3D models transmitted by data storage device;
   determining, by the system, a relative location of an anomaly indicative of a failing or failed part in equipment;
   overlaying, by the system, a 3D image map from the 3D models to identify a specific part or assemblies or subassemblies within the 3D model corresponding to the relative location of the anomaly;
   determining, by the system, associated parts related to the specific part or assemblies or subassemblies identified for grouping them as a kit within the 3D model of equipment; and
   adding, by the system, the kit to a virtual shopping cart for initiating an electronic transaction in reference to the kit depicted in the 3D model of equipment,
   wherein the step of overlaying, by the system, a 3D image map from the 3D models to identify a specific part within the 3D model corresponding to the relative location of the anomaly, includes:
   superimposing the 3D image map over the relative location of the anomaly in equipment; and
   comparing X, Y and Z coordinates from the 3D model to the relative location of the anomaly to identify the specific part or assemblies or subassemblies within the 3D model of equipment.

2. The method of claim 1, wherein the type of equipment is identified using one of Radio Frequency identification, Quick Response identification, barcode identification, and imaging techniques.

3. The method of claim 1, wherein the step of requesting the 3D models includes providing, by the system, search criteria corresponding to equipment identified.

4. The method of claim 3, wherein when the system requests data storage device for the 3D models, data storage device performs steps of:
   receiving the search criteria comprising parametric data and metadata of equipment;
   parsing the search criteria for querying a database containing 3D models of equipment;

retrieving the 3D models that match the search criteria; and transmitting the matching 3D models to the system.

5. The method of claim 1, wherein the search criteria includes parametric data and metadata of equipment, wherein parametric data and metadata of equipment includes one of a part number, part description, a model number, assembly part number, assembly description, size, weight, diameter, stock or catalog number, price, and alternative replacement part(s).

6. The method of claim 1, wherein the step of determining, by the system, a relative location of an anomaly in equipment, includes:
sensing a change in physical parameters of the part or surroundings of the part.

7. The method of claim 1, wherein the step of overlaying, by the system, a 3D image map from the 3D models to identify a specific part within the 3D model corresponding to the relative location of the anomaly, includes:
applying a confidence factor to identify the specific part or assemblies or subassemblies within the 3D model corresponding to the relative location of the anomaly in equipment.

8. A method for determining a failing or failed part in equipment and initiating an electronic transaction for placing an online order for replacing the failing or failed part, method comprising:
inspecting, by a system, equipment;
detecting, by the system, presence of an error message being broadcasted from equipment;
i) if it is determined that the error message is being broadcasted by equipment,
determining, by the system, the type of equipment from the error message,
requesting, by the system, three-dimensional (3D) models corresponding to equipment identified from a data storage device;
accessing, by the system, the 3D models transmitted by data storage device; and
accessing 3D components in the 3D models corresponding to an anomaly indicative of a failing or failed part in equipment to identify a specific part or assemblies or subassemblies within the 3D model with respect to the anomaly, wherein the anomaly in equipment is identified from the error message,
wherein the step of overlaying, by the system, a 3D image map from the 3D models to identify a specific part within the 3D model corresponding to the relative location of the anomaly, includes:
superimposing the 3D image map over the relative location of the anomaly in equipment; and
comparing X, Y and Z coordinates from the 3D model to the relative location of the anomaly in equipment to identify the specific part or assemblies or subassemblies within the 3D model of equipment,
or
ii) if it is determined that the error message is not being broadcasted by equipment,
identifying, by the system, a type of equipment by scanning equipment;
requesting, by the system, three-dimensional (3D) models corresponding to equipment identified from a data storage device;
accessing, by the system, the 3D models transmitted by data storage device;

determining, by the system, a relative location of an anomaly indicative of a failing or failed part in equipment; and overlaying, by the system, a 3D image map from the 3D models to identify a specific part or assemblies or subassemblies within the 3D model corresponding to the relative location of the anomaly;

determining, by the system, associated parts related to the specific part or assemblies or subassemblies for grouping them as a kit in the 3D model of equipment; and adding, by the system, the kit to a virtual shopping cart for initiating an electronic transaction in reference to the kit depicted in the 3D model of equipment, wherein the step of overlaying, by the system, a 3D image map from the 3D models to identify a specific part within the 3D model corresponding to the relative location of the anomaly, includes:
superimposing the 3D image map over the relative location of the anomaly in equipment; and
comparing X, Y and Z coordinates from the 3D model to the relative location of the anomaly in equipment to identify the specific part or assemblies or subassemblies within the 3D model of equipment.

9. The method of claim 8, wherein the error message includes information corresponding to equipment and the anomaly, wherein the information includes one of a part number, part description, a model number, assembly part number, assembly description, size, weight, diameter, and catalog number.

10. The method of claim 8, wherein if it is determined that the error message is not being broadcasted by equipment, the type of equipment is identified using one of Radio Frequency identification, Quick Response identification, barcode identification, and imaging techniques.

11. The method of claim 8, wherein the step of requesting the 3D models includes providing, by the system, search criteria corresponding to equipment identified.

12. The method of claim 11, wherein when the system requests data storage device for the 3D models when it is determined that the error message is not being broadcasted by equipment, data storage device performs steps of:
receiving the search criteria comprising parametric data and metadata of equipment;
parsing the search criteria for querying a database containing 3D models of equipment;
retrieving the 3D models that match the search criteria; and
transmitting the matching 3D models to the system.

13. The method of claim 8, wherein the step of determining, by the system, a relative location of an anomaly indicative of a failing or failed part in equipment, includes:
sensing a change in physical parameters of the part or surroundings of the part.

14. The method of claim 8, wherein the step of overlaying, by the system, a 3D image map from the 3D models to identify a specific part within the 3D model corresponding to the relative location of the anomaly, includes:
applying a confidence factor to identify the specific parts or assemblies or subassemblies within the 3D model corresponding to the relative location of the anomaly in equipment.

15. A system for determining a failing or failed part in equipment and initiating an electronic transaction for placing an online order for replacing the failing or failed part, the system comprising:
a processor; and a memory coupled to the processor, wherein the processor is configured to execute program instructions stored in the memory, to:
  inspect equipment;
  detect presence of an error message being broadcasted from equipment;
  if the error message is not being broadcasted by equipment, identify a type of equipment by scanning equipment;
  request three-dimensional (3D) models corresponding to equipment identified from a data storage device;
  access the 3D models transmitted by data storage device;
  determine a relative location of an anomaly indicative of a failing or failed part in equipment;
  overlay a 3D image map from the 3D models to identify a specific part or assemblies or subassemblies within the 3D model corresponding to the relative location of the anomaly;
  determine associated parts related to the specific part or assemblies or subassemblies identified for grouping them as a kit within the 3D model of equipment; and
  add the kit to a virtual shopping cart for initiating an electronic transaction in reference to the kit depicted in the 3D model of equipment,
wherein the step of overlaying, by the system, a 3D image map from the 3D models to identify a specific part within the 3D model corresponding to the relative location of the anomaly, includes:
  superimposing the 3D image map over the relative location of the anomaly in equipment; and
  comparing X, Y and Z coordinates from the 3D model to the relative location of the anomaly in equipment to identify the specific part or assemblies or subassemblies within the 3D model of equipment.

16. The system of claim 15, wherein the system includes one of an unmanned vehicle, a robot, and an electronic device.

17. The system of claim 15, wherein equipment includes one of a machine, an engine, vehicles including land and air vehicles, heavy machinery, and home appliances.

18. The system of claim 15, wherein the processor is further configured to execute the program instructions to:
  superimpose the 3D image map from the 3D model over the relative location of the anomaly in equipment;
  compare X, Y and Z coordinates from the 3D model to the relative location of the anomaly in equipment to identify the specific part or assemblies or subassemblies identified within the 3D model of equipment corresponding to the relative location of the anomaly; and
  apply a confidence factor to identify the specific part or assemblies or subassemblies within the 3D model corresponding to the relative location of the anomaly in equipment.

* * * * *